United States Patent [19]
Osborne et al.

[11] Patent Number: 4,973,210
[45] Date of Patent: Nov. 27, 1990

[54] ANCHORS FOR FIXING TO DENSE CONCRETE, MASONRY AND THE LIKE

[75] Inventors: Michael L. Osborne, Sutton Coldfield; Stephen J. Morris, Birmingham; Stephen G. Richardson, Walsall, all of England

[73] Assignee: Emhart Industries, Inc., Towson, Md.

[21] Appl. No.: 392,880

[22] Filed: Aug. 11, 1989

[30] Foreign Application Priority Data

Aug. 20, 1988 [GB] United Kingdom ............... 8819820

[51] Int. Cl.$^5$ ............................................. F16B 35/00
[52] U.S. Cl. ................................... 411/389; 411/107; 411/178; 411/217; 411/418
[58] Field of Search ............ 411/386, 387, 389, 397, 411/216, 217, 271, 939, 417, 420, 421, 914; 408/227, 230

[56] References Cited

U.S. PATENT DOCUMENTS

| | | | |
|---|---|---|---|
| 2,281,543 | 5/1942 | Baumbach | 411/217 |
| 3,134,290 | 5/1964 | Jentoft | 411/377 |
| 4,223,585 | 9/1980 | Barth et al. | 411/389 |
| 4,350,464 | 9/1982 | Brothers | 411/389 |
| 4,381,162 | 4/1983 | Hosol | 408/230 |
| 4,616,964 | 10/1986 | Nomura | 408/230 |
| 4,636,125 | 1/1987 | Burgard | 411/389 |
| 4,652,194 | 3/1987 | Tajima et al. | 411/417 |
| 4,730,970 | 3/1988 | Hyner et al. | 411/914 |
| 4,842,467 | 6/1989 | Armstrong | 411/417 |

FOREIGN PATENT DOCUMENTS 2625372 12/1976 Fed. Rep. of Germany ...... 411/417

Primary Examiner—Neill R. Wilson
Attorney, Agent, or Firm—Spencer Smith

[57] ABSTRACT

A non-expandible anchor for use in tensile zones of strong material having a compressive strength of at least 20 N/mm$^2$ includes a cutting portion having a deep, coarse, raised, external helix formed with a cutting edge and having interruptions along the helix which act as chip breakers and permit removal of debris during insertion in a pre-prepared bore drilled in the strong material.

4 Claims, 1 Drawing Sheet

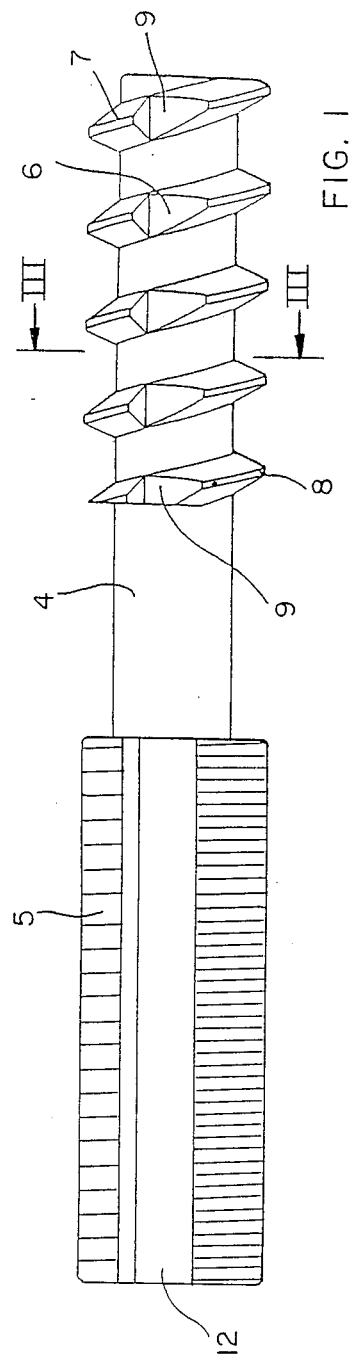

ANCHORS FOR FIXING TO DENSE CONCRETE, MASONRY AND THE LIKE

BACKGROUND OF THE INVENTION

The present invention relates to anchors providing fixing to dense concrete, masonry and the like, the anchor being secured in a hole bored for its reception in a mass of dense concrete, masonry or the like.

Anchors are known in the form of a threaded bolt provided with an expandible sleeve which is placed in a pre-prepared bore and the sleeve expanded in the bore by drawing up the bolt by a threaded nut. Many forms of such sleeve anchors have been proposed and used, and it has been proposed, for example, to provide enhanced performance by providing a very large expansion of the sleeve. It has also been proposed to use such anchors in bores formed with various undercuts, particularly to improve the efficiencies of anchors subjected to tensile loads.

It has also been proposed to secure anchors, screw or plugs in soft materials which are provided with an external cutting means such as a screw thread which can produce undercutting by rotation of the anchor or plug when inserting it into the pre-prepared bore, but it has not been possible to use these in dense materials such as concrete.

It has also been proposed to use anchors in the form of a headed screw which is driven into a hole in concrete or masonry.

To date, however, none of these anchors have yet been able to reach required minimum performance standards for example in the compressive and tensile zones of concrete and still less the higher standards now proposed for minimum performance in tensile zones of concrete.

SUMMARY OF THE INVENTION

According to the present invention, we provide a non-expanding anchor adapted to accomodate high tensile loads in strong materials comprising a cutting shaft of high-tensile metal having at one end a fastening portion having an external thread for reception of a nut and/or a tapped bore for reception of a screw and having a cutting portion at the other end provided with a deep, coarse, raised, external helix formed with a cutting edge and having interruptions along the helix which act as chip breakers and permit removal of debris insertion in a pre-prepared bore drilled in said strong material. The anchor may be made of steel, which may be plated and passivated, hot dip galvanised, plastic coated or otherwise protected or stainless steel may be used. The cutting slot for the reception of a drive-in key to prevent the anchor from rotating after installation in the bore is completed. Part of the slot for the drive-in key may be provided by helix interruptions in line with a slot formed in the fastening portion of the anchor.

The term 'strong materials' is defined to include concrete, masonry, brickwork or the like with a compressive strength of at least 20 N/mm$^2$. Concrete is often used with a compressive strength from 20 N-mm$^2$ to 60 N/mm$^2$ and reclaimed brickwork may be estimated at 34 N/mm$^2$. The term 'strong material' thus also includes lightweight concretes ordinary Portland Cement with lightweight aggregate) which similarly can have compressive strengths of 20 N/mm$^2$ to 40 N/mm$^2$. For comparison, typical lightweight or aerated building blocks have a compressive strength of 3½–7 N/mm$^2$.

Further according to the present invention we provide a method for securing items in strong materials such as dense concrete, comprising the steps of first boring a hole in the material, then driving into the hole with rotary motion a non-expanding anchor comprising a cutting portion at the other end having a deep, coarse, raised, external helix formed with a cutting edge and having interruptions along the helix until the cutting portion is fully inserted into the hole and finally applying, as appropriate, a screw or stud to the fastening portion of the anchor.

The cutting portion is driven into the hole by a combination of impact and rotary motion so that the cutting edge cuts an undercut thread in the strong material of the permanent part of the installed anchor.

After the step of cutting the thread in the strong material of the hole wall, it may be preferred to lock the anchor from rotation and for this purpose a drive-in key may be located within a slot formed in the cutting shaft for this purpose.

In order that the invention be better understood, preferred embodiments will now be described in greater detail by way of example with reference to the accompanying drawings in which:

BRIEF DESCRIPTION OF THE DRAWINGS

FIG. 1 is a side view in elevation of an anchor adapted to receive a securing nut;

FIG. 2 is a partial side view in elevation of an anchor adapted to receive a securing screw, and FIG. 3 is a section on line III—III of FIG. 1.

DETAILED DESCRIPTION OF THE DRAWINGS

An tensile anchor according to the present invention comprises (FIGS. 1 and 3) a stainless steel cutting shaft 4 formed in one piece with an externally threaded fastening poriton 5 adapted for the reception of a nut (not shown) and a cutting portion 6 having at the other end a deep, coarse, raised external helix 7. The raised helix 7 is deep-rooted in form and has a cutting edge 8 which may be reinforced with inserts of tungsten carbide (not shown). Interruptions 9 are formed at intervals of 120° along helix 6 so that every third interruption falls in a line to act as a longitudinal slot through the cutting portion 6. A corresponding longitudinal slot 12 may be formed along fastening section 5 to line up with one row of one third of the 120° spaced interruptions 9.

The female anchor according to the invention illustrated in FIG. 2 has a fastening portion 10 in place of fastening portion 5, fastening portion 10 having an internally-threaded bore 11 for the reception of a screwed stud (not shown).

To secure the anchor in a mass of strong material such as dense concrete, masonry or brickwork a hole is first bored having a diameter equal to the root diameter d of the raised helix 7, the hole having a depth at least equal to that part of cutting portion 6 carrying the raised helix 7. The cutting portion 6 is then driven into the hole by oscillating rotary hammer blows and the cutting portion 6 of the anchor 4 forms an undercut thread formed in the walls of the hole. Debris formed by this cutting action is passed up the helix with the aid of the interruptions until the entire helix 7 is housed in the hole. If desired, a key may then be driven into the longitudinal slot 12 passing through the concrete, masonry or brickwork along a line of interruptions ih the raised helix embedded in the hole which prevents the fastening from rotating or from being removed from the hole. A nut on fastening portion 5 or a screw in bore 11 or fastening portion 10 will then hold against high tensile loading, since the raised helix 6 is such a snug fit in the thread undercut in the walls of the hole in the strong material (e.g. concrete).

The strength of the fastening remains high even if cracks develop in the concrete. This is by virtue of the deep engagement of the raised helix with the thread cut into the concrete.

Although the performance of anchors according to the present invention is outstanding in tensile zone situations, the performance of the anchor in compression zone situations is also very impressive.

I claim:

1. A non-expanding anchor adapted to accommodate high tensile loads in strong materials comprising cutting shaft of high-tensile metal having at one end a fastening portion with an external thread for reception of a nut and/or tapped bore for reception of a screw and having a cutting portion at the other end including a uniform diameter shaft provided with a uniform deep, coarse, raised, external helix formed with a cutting edge and having interruptions along the helix which act as chip breakers and permit removal of debris during insertion into a hole drilled in the material said interruptions being selectively located so that each interruption in each crest will lie along one of a plurality of straight lines parallel to said shaft and said fastening portion having a diameter larger than the diameter of said cutting portion and having an axially extending slot defined therein to be in axial alignment with one of said lines of interruptions so that a key can be Driven through the material and through at least one of said interruptions to lock the anchor in position.

2. A non-expanding anchor according to claim 1 wherein said plurality is three.

3. A non-expanding anchor according to claim 1 wherein each interruption is defined by two planer intersecting surfaces with one surface of each interruption being tangential with said shaft.

4. A non-expanding anchor according to claim 3 wherein the other surface of each of said interruptions is perpendicular to said shaft.

* * * * *